(12) United States Patent
Lee et al.

(10) Patent No.: US 8,316,645 B2
(45) Date of Patent: Nov. 27, 2012

(54) TRIPLE SWIRL GAS TURBINE COMBUSTOR

(75) Inventors: Min Chul Lee, Daejeon-si (KR); Dal Hong Ahn, Daejeon-si (KR); Yong Jin Joo, Daejeon-si (KR); Jae Hwa Chung, Daejeon-si (KR); Si Moon Kim, Daejeon-si (KR); Jin Pyo Hong, Daejeon-si (KR); Won Shik Park, Daejeon-si (KR)

(73) Assignee: Korea Electric Power Corporation, Seoul (KR)

( * ) Notice: Subject to any disclaimer, the term of this patent is extended or adjusted under 35 U.S.C. 154(b) by 329 days.

(21) Appl. No.: 12/422,065

(22) Filed: Apr. 10, 2009

(65) Prior Publication Data
US 2010/0107643 A1 May 6, 2010

(30) Foreign Application Priority Data

Oct. 31, 2008 (KR) .................. 10-2008-0107771

(51) Int. Cl.
*F02C 1/00* (2006.01)
*F02G 3/00* (2006.01)

(52) U.S. Cl. ............... 60/748; 239/399; 60/752; 60/737; 60/740; 60/738

(58) Field of Classification Search ............ 60/748, 60/737, 752, 740, 738; 239/399–406
See application file for complete search history.

(56) References Cited

U.S. PATENT DOCUMENTS

| | | | |
|---|---|---|---|
| 3,990,834 A * | 11/1976 | DuBell et al. | 431/264 |
| 4,991,398 A * | 2/1991 | Clark et al. | 60/748 |
| 5,359,847 A | 11/1994 | Pillsbury et al. | |
| 5,603,211 A | 2/1997 | Graves | |
| 6,460,345 B1 | 10/2002 | Beebe et al. | |
| 6,474,071 B1 | 11/2002 | Durbin et al. | |
| 6,655,145 B2 * | 12/2003 | Boardman | 60/737 |
| 6,993,916 B2 | 2/2006 | Johnson et al. | |
| 7,673,454 B2 | 3/2010 | Saito et al. | |

(Continued)

FOREIGN PATENT DOCUMENTS

CN 1112997 A 12/1995

(Continued)

OTHER PUBLICATIONS

Korean Office Action, issued in Korean Patent Application No. 10-2008-0107771, dated Oct. 29, 2010.

(Continued)

*Primary Examiner* — William H Rodriguez
*Assistant Examiner* — Craig Kim
(74) *Attorney, Agent, or Firm* — McDermott Will & Emery LLP

(57) ABSTRACT

Disclosed is a triple swirl gas turbine combustor using various fuels such as coal gas, DiMethyl Ether, and waste gas generated in an ironworks in a gas turbine. The triple swirl gas turbine combustor combusts three different fuels simultaneously or individually and various fuels such as LCV gas and HCV gas so that fuel flexibility can be improved. Swirl generated in a second swirler of the triple swirler is reversely jetted to increase a mixing degree of a fuel-air mixture and an intensity of a turbulent flow so that combustion efficiency can be increased, harmful exhaust gas can be reduced and vibration can be reduced.

7 Claims, 3 Drawing Sheets

U.S. PATENT DOCUMENTS

| | | |
|---|---|---|
| 2002/0043067 A1 | 4/2002 | Maeda et al. |
| 2003/0089112 A1 | 5/2003 | Durbin et al. |
| 2005/0268618 A1 | 12/2005 | Johnson et al. |
| 2006/0035188 A1 | 2/2006 | Berenbrink et al. |
| 2007/0227156 A1 | 10/2007 | Saito et al. |
| 2008/0078181 A1* | 4/2008 | Mueller et al. .................. 60/776 |
| 2008/0083224 A1* | 4/2008 | Varatharajan et al. .......... 60/748 |
| 2008/0098736 A1 | 5/2008 | Lee et al. |
| 2008/0163627 A1 | 7/2008 | Elkady et al. |

FOREIGN PATENT DOCUMENTS

| | | |
|---|---|---|
| CN | 101220953 A | 7/2008 |
| JP | 59-202324 A | 11/1984 |
| JP | 64-005663 U | 1/1989 |
| JP | 2-93210 A | 4/1990 |
| JP | 2-183720 A | 7/1990 |
| JP | 07-055148 A | 3/1995 |
| JP | 2000-291448 A | 10/2000 |
| JP | 2001-235120 A | 8/2001 |
| JP | 2002-106845 A | 4/2002 |
| JP | 2003-004232 A | 1/2003 |
| JP | 2005-090884 A | 4/2005 |
| JP | 2005-265232 A | 9/2005 |
| JP | 2006-507466 A | 3/2006 |
| JP | 2006-258041 A | 9/2006 |
| JP | 2007-036964 A | 2/2007 |
| JP | 2008-031847 A | 2/2008 |
| JP | 2008-096099 A | 4/2008 |
| JP | 2008-116200 A | 5/2008 |
| KR | 10-0716889 B1 | 5/2007 |
| WO | WO 2007/036964 A1 | 4/2007 |

OTHER PUBLICATIONS

Japanese Office Action, issued in Japanese Patent Application No. 2009-089113, dated Jan. 23, 2011.

Chinese Office Action, issued in Chinese Patent Application No. 200910133933.7, dated Oct. 29, 2010.

European Search Report issued in Application No. 09005357.0 issued on May 24, 2012.

* cited by examiner

TRIPLE SWIRL GAS TURBINE COMBUSTOR

CROSS-REFERENCE TO RELATED APPLICATION

The present application claims priority of Korean Patent Application Number 10-2008-0107771 filed Oct. 31, 2008, the entire contents of which application is incorporated herein for all purposes by this reference.

BACKGROUND OF THE INVENTION

1. Field of the Invention

The present invention relates to a triple swirl gas turbine combustor and, more particularly to, a triple swirl gas turbine combustor in which a combustion performance, overall available rate, and fuel flexibility of a gas turbine are increased.

2. Description of Related Art

In recent years, since energy price is increased and global warming becomes more serious, it significantly needs to increase efficiency of a power generating facility and to develop technology using new renewable energy.

An integrated gasification combined cycle (IGCC) using a gas turbine is a current power generating system having the highest efficiency. Since the IGCC can gasify biomass, coal, and garbage such as waste carpet to generate electricity when a gasification system is coupled therewith, the IGCC is useful to generate electric power using various types of fuels.

However, since combined gas generated by gasifying various fuels has various components and a low calorific value, gas turbine combustion technology improved than an existing technology is required. That is, it is required a gas turbine capable of combusting various gas fuels stably.

In general, a gas turbine is a rotary type heat engine including a combustion chamber provided with a plurality of burners at an upper side and driving turbine with combusted fuel gas at high temperature and high pressure. A gas turbine combustor mounted to the gas turbine includes a single combustor can to which a plurality of fuel nozzles respectively having a single swirler is mounted. A plurality of combustor cans is mounted on the center of a rotor of the gas turbine.

However, in the gas turbine combustor having a single swirler, a weak turbulent flow leads unstable flame, and insufficient mixture of fuel and air generates NOx and causes imperfect combustion.

BRIEF SUMMARY OF THE INVENTION

Therefore, the present invention has been made in view of the above problems, and the present invention provides a triple swirl gas turbine combustor capable of combusting triple kinds of fuels simultaneously or individually, of combusting a low calorific value (LCV) gas and a high calorific value (HCV) gas to improve fuel flexibility, and of jetting swirl generated from a second swirler of the triple swirlers in the reverse direction so that combustion efficiency can be increased, harmful exhaust gas can be reduced, vibration can be reduced due to increase of a mixing degree of fuel-air mixture and intensity of turbulent flow.

In accordance with an embodiment of the present invention, a triple swirl gas turbine combustor comprising: a case to which an igniter is attached; a combustor liner where ignition is performed by the igniter and having a compressed air inlet, formed at a side of the case, through which compressed air is introduced from a gas turbine compressor and a plurality of cooling air inlets; and a burner having a plurality of air feeding swirlers with fuel jetting swirl vanes which are concentrically disposed inside a burner head positioned at the upper side of the combustor liner to generate a vortex in the compressed air.

Preferably, the swirler comprises a first swirler disposed at the bottom from a central shaft of the swirler; a third swirler disposed at the top; and a second swirler disposed between the first swirler and the third swirler.

The swirler forms a cone shape such that distances between fuel passages positioned at the lower side of the swirler are increased as goes outwardly from the center.

Each of the fuel jetting swirl vane includes a fuel jetting hole 212 formed at a side of a vane blade and fuel jetting holes formed in the longitudinal direction by a preset interval to jet fuel introduced through the fuel jetting hole.

The swirl vanes rotate in the first swirler and the third swirler in the same direction and rotate in the second swirler in the direction reverse to that in the first swirler and the third swirler.

The fuel jetting holes are increased as goes outwardly in the swirl vanes.

The first swirler includes a lift-off air holes through which lift-off air is introduced to prevent a flame from staying at the center.

The burner head includes dump plane cooling air jetting holes to feed dump plane cooling air toward an inner side thereof.

According to the triple swirl gas turbine combustor of the present invention, triple types of fuels can be combusted simultaneously or individually, various fuels such as an LCV gas and a HCV gas can be combusted to improve the fuel flexibility, mixing degree of the fuel-air mixture and intensity of a turbulent flow are increased so that combustion efficiency can be increased, harmful exhaust gas can be reduced, and vibration during the combustion can be reduced.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, a triple swirl gas turbine combustor according to various embodiments of the present invention will be described in detail with reference to the accompanying drawings.

Figure 1:
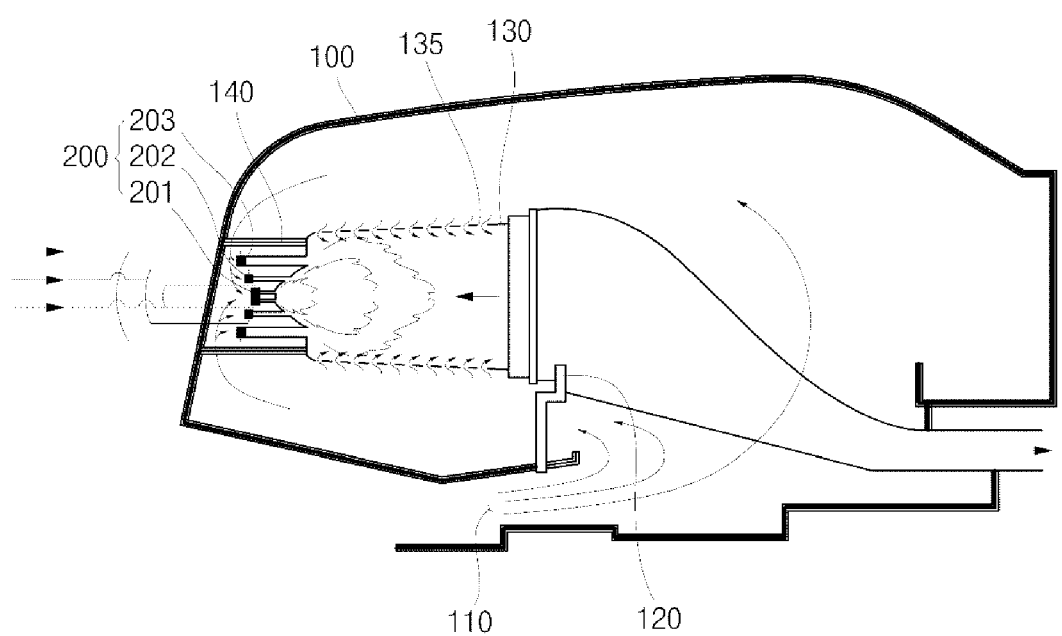
FIG. 1 is a view schematically illustrating a triple swirl gas turbine combustor according to an embodiment of the present invention.
Figure 2:
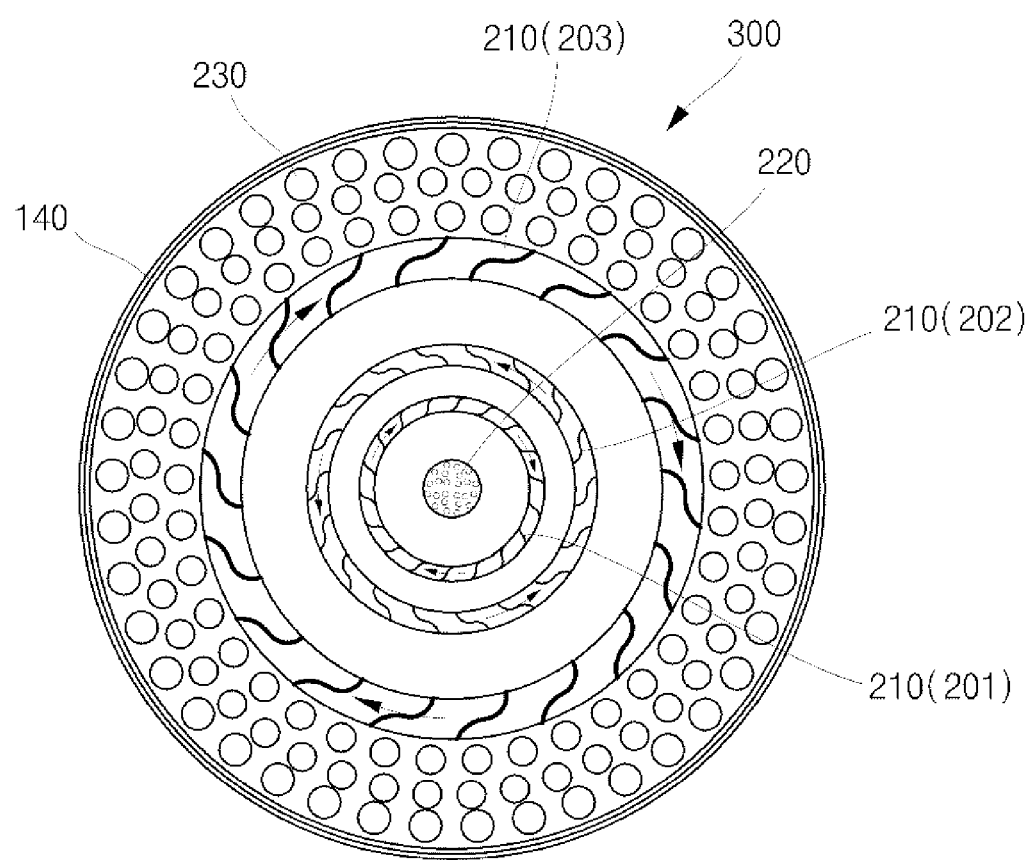
FIG. 2 is a sectional view illustrating a burner of the triple swirl gas turbine combustor according to the embodiment of the present invention.
Figure 3:
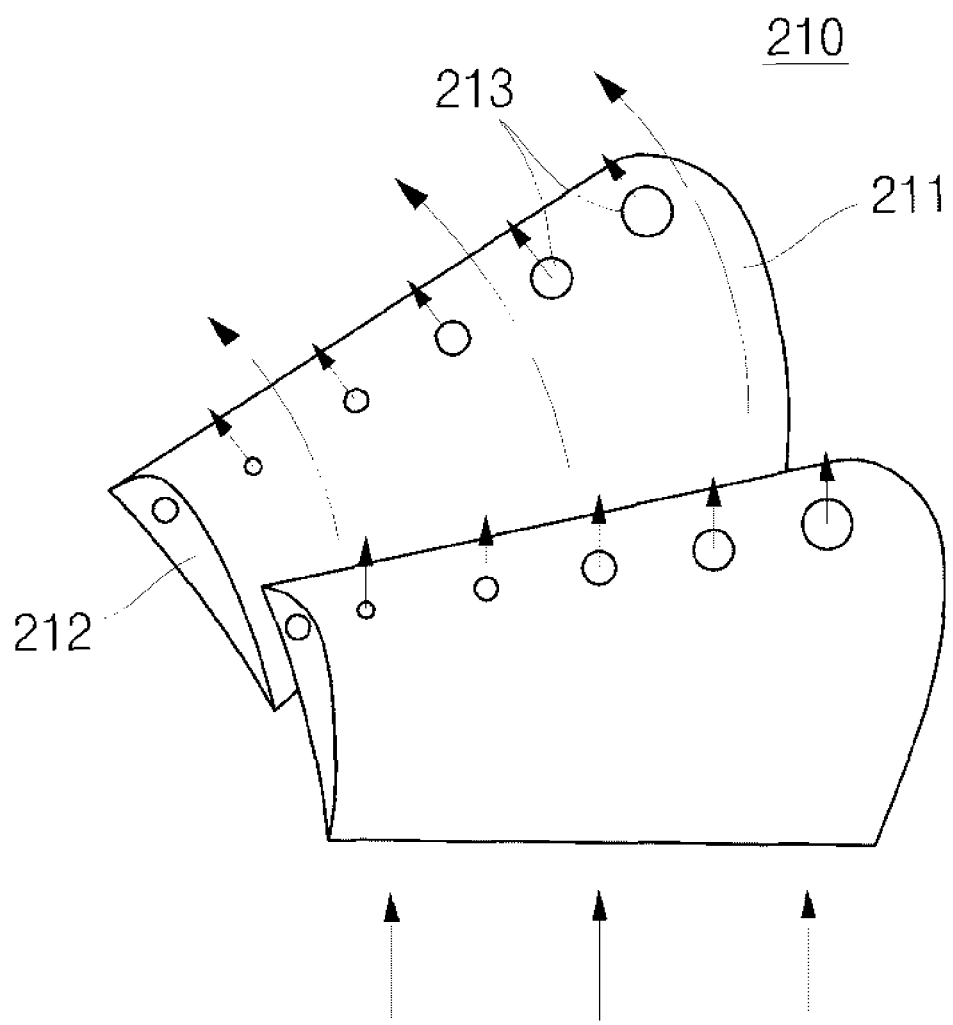
FIG. 3 is a view illustrating swirl vanes of the triple swirl gas turbine combustor according to the embodiment of the present invention.

FIG. 1 is a view schematically illustrating a triple swirl gas turbine combustor according to an embodiment of the present invention. FIG. 2 is a sectional view illustrating a burner of the triple swirl gas turbine combustor according to the embodiment of the present invention. FIG. 3 is a view illustrating swirl vanes of the triple swirl gas turbine combustor according to the embodiment of the present invention.

The triple swirl gas turbine combustor according to the embodiment of the present invention, as illustrated in FIG. 1, includes a case 100 to which an igniter 120 is attached, a combustor liner 130 where ignition is performed by the igniter 120 and having a compressed air inlet 110, formed at a side of the case 100, through which compressed air is introduced from a gas turbine compressor and a plurality of cooling air inlets 135, and a burner 300 having an air feeding swirler 200 installed inside a burner head 140 that is positioned at an upper side of the combustor liner 130 to generate a vortex in the feeding compressed air.

In this case, the compressed gas is introduced through the compressed air inlet 110 such that combustion air is fed to the burner head 140, and simultaneously the cooling air is fed to the combustor liner 130. The cooling air is suctioned into the combustor liner 130 through the cooling air inlets 135 to cool the combustor liner 130.

By doing so, it is possible to prevent damage of the combustor liner 130 caused by high-temperature combustion gas and to prolong lifespan thereof.

The compressed air fed to the burner head 140 is jetted toward the combustor via the triple concentric swirler 200.

In the swirl vanes 210 mounted to the respective swirlers 200, as illustrated in FIG. 3, fuel is fed into the swirl vanes 210 through fuel injecting holes 212 formed at sides of vane blades 211 and is jetted through fuel jetting holes 213.

In this case, the fuel jetting holes 213 are disposed in the longitudinal direction of the swirl vanes 210 by a preset interval and are gradually increased as goes outwardly in the swirl vanes 210.

The reason why the fuel jetting holes 213 are gradually increased as goes outward is because large fuel jetting holes 213 are advantageous of combusting fuel when a large quantity of LCV fuel is fed to a third swirler 203 of the swirlers 200.

In other words, in a case where the first swiler 201, the smallest swirler is used to increase flame stability when the triple swirl gas turbine combustor is driven, it is preferable to use a fuel having high calorific value and good combustibility such as heavy oil, natural gas, and the like. On the other hand, when the largest third swirler 203 is used, it is preferable to use fuel having an LCV such as coal gas, waste gas generated in an ironworks.

As such, in the triple swirler 200, as illustrated in FIG. 2, the ring-shaped first to third swirlers 201, 202, and 203, and the burner head 140 are sequentially disposed in a concentric manner from the center, and same or different fuels can be fed simultaneously or individually to the respective swirlers 200 and the LCV gas and the HCV gas can be fed so that fuel flexibility can be improved.

Moreover, since the first swirler 201 is positioned at the bottom of a central shaft of the swirler 200, the third swirler 203 is positioned at the top, and the second swirler 202 is positioned at the middle, the third swirler 203 is positioned farthest away from the flame in the combustion chamber.

In other words, as illustrated in FIG. 1, the upper side of the burner 300 is downwardly inclined toward the center.

On the other hand, the bottom of the burner 300 is upwardly inclined toward the center so that the first swirler 201 has the shortest interval of fuel passage.

As such, the swirler 200 has a cone shape such that a space between the respective swirlers 200, that is, distances between fuel passages positioned at the bottom of each of the first, second, and third swirlers 201, 202, and 203 are gradually increased from the center to the outer side to make an air actively flow. As a result, as shown in FIG. 2, a space between fuel passages of the second swirler 202 is larger than a space between fuel passages of the first swirler 201 and smaller than a space between fuel passages of the third swirler 203.

The first swirler 201 has lift-off air holes 220 formed at the central region so that lift-off air fed through the lift-off air holes 220 prevents the flame from staying at the central region.

Moreover, the burner head 140 has dump plane cooling air jetting holes 230 formed in an inner side thereof such that dump plane cooling air is fed through the dump plane cooling air jetting holes 230 to stabilizing combustion flame and to prevent a high temperature region from being generated in the flame.

The swirl vanes 210 rotate in the first and third swirlers 201 and 203 in the same direction and rotate in the second swirler 202 in the direction reverse to that in the first and third swirlers 201 and 203. The swirl vanes 210, when viewing from the bottom of the burner 300, rotate clockwise in the first swirler 201, counterclockwise in the second swirler 202, and clockwise in the third swirler 203.

Due to this configuration, the mixing degree of the fuel-air mixture and intensity of a turbulent flow are increased so that the combustion efficiency is increased, harmful exhaust gas is reduced, and vibration is reduced.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A triple swirl gas turbine combustor comprising:
   a case to which an igniter is attached;
   a combustor liner where ignition is performed by the igniter and having a compressed air inlet, formed at a side of the case, through which compressed air is introduced from a gas turbine compressor and a plurality of cooling air inlets; and
   a burner having an air feeding swirler including first, second, and third swirlers with fuel jetting swirl vanes which are concentrically disposed inside a burner head positioned at the upper side of the combustor liner to generate a vortex in the compressed air,
   wherein the first swirler, the second swirler, and the third swirler are concentrically disposed in that order from a central shaft of the air feeding swirler,
   wherein the third swirler is located axially upstream of the first and second swirlers from a flame in the combustor liner,
   wherein each of the fuel jetting swirl vanes of the first, second, and third swirlers includes a fuel injecting hole formed at a side of a vane blade and fuel jetting holes formed in the longitudinal direction to jet fuel introduced through the fuel injecting hole, and
   wherein distances between fuel passages positioned at lower sides of the first, second and third swirlers increase as the fuel passages are located more outwardly from a center, such that a space between fuel passages of the second swirler is larger than a space between fuel passages of the first swirler and smaller than a space between fuel passages of the third swirler.

2. The triple swirl gas turbine combustor of claim 1, wherein the swirl vanes rotate in the first swirler and the third swirler in the same direction and rotate in the second swirler in the direction reverse to that in the first swirler and the third swirler.

3. The triple swirl gas turbine combustor of claim 1, wherein diameters of the fuel jetting holes are increased as goes outwardly in the swirl vanes.

4. The triple swirl gas turbine combustor of claim 1, wherein the first swirler includes a lift-off air hole through which lift-off air is introduced to prevent a flame from staying at the center.

5. The triple swirl gas turbine combustor of claim 1, wherein the burner head includes dump plane cooling air jetting holes to feed dump plane cooling air toward an inner side thereof.

6. The triple swirl gas turbine combustor of claim 4, wherein the lift-off air hole is in a central region of the first swirler.

7. The triple swirl gas turbine combustor of claim 5, wherein the dump plane cooling air jetting holes are concentrically disposed in the burner head around the periphery of the third swirler.

* * * * *